(12) United States Patent
Wang et al.

(10) Patent No.: US 12,236,277 B2
(45) Date of Patent: Feb. 25, 2025

(54) APPARATUS AND METHOD FOR SECONDARY OFFLOADS IN GRAPHICS PROCESSING UNIT

(71) Applicant: Shanghai Biren Technology Co., Ltd, Shanghai (CN)

(72) Inventors: HaiChuan Wang, Shanghai (CN); Song Zhao, Shanghai (CN); GuoFang Jiao, Shanghai (CN); ChengPing Luo, Shanghai (CN); Zhou Hong, Shanghai (CN)

(73) Assignee: Shanghai Biren Technology Co., Ltd, Shanghai (CN)

( * ) Notice: Subject to any disclaimer, the term of this patent is extended or adjusted under 35 U.S.C. 154(b) by 25 days.

(21) Appl. No.: 18/305,085

(22) Filed: Apr. 21, 2023

(65) Prior Publication Data

US 2023/0267011 A1 Aug. 24, 2023

Related U.S. Application Data

(62) Division of application No. 17/366,383, filed on Jul. 2, 2021, now Pat. No. 11,663,044.

(30) Foreign Application Priority Data

Oct. 22, 2020 (CN) .......................... 202011140493.0

(51) Int. Cl.
*G06F 9/30* (2018.01)
*G06F 8/41* (2018.01)
(Continued)

(52) U.S. Cl.
CPC .............. *G06F 9/5044* (2013.01); *G06F 8/41* (2013.01); *G06F 9/3877* (2013.01);
(Continued)

(58) Field of Classification Search
CPC ........ G06F 9/5044; G06F 8/41; G06F 9/3877; G06F 9/4881; G06F 9/52; G06F 13/28; G06F 15/163
See application file for complete search history.

(56) References Cited

U.S. PATENT DOCUMENTS 7,920,701 B1 4/2011 Cox et al.
10,769,748 B2 * 9/2020 Nurvitadhi ............ G06F 9/3895
(Continued)

FOREIGN PATENT DOCUMENTS

CN 1266598 C 7/2006
CN 104798056 A 7/2015
(Continued)

*Primary Examiner* — Corey S Faherty
(74) *Attorney, Agent, or Firm* — Birch, Stewart, Kolasch & Birch, LLP

(57) ABSTRACT

The invention relates to an apparatus for second offloads in a graphics processing unit (GPU). The apparatus includes an engine; and a compute unit (CU). The CU is arranged operably to: fetch execution codes; when each execution code is suitable to be executed by the CU, execute the execution code; and when each execution code is not suitable to be executed by the CU, generate a corresponding entry, and send a request with the corresponding entry to the engine for instructing the engine to allow a component inside or outside of the GPU to complete an operation in accordance with the corresponding entry.

20 Claims, 11 Drawing Sheets

(51) Int. Cl.
*G06F 9/38* (2018.01)
*G06F 9/48* (2006.01)
*G06F 9/50* (2006.01)
*G06F 9/52* (2006.01)
*G06F 13/28* (2006.01)
*G06F 15/163* (2006.01)

(52) U.S. Cl.
CPC .............. *G06F 9/4881* (2013.01); *G06F 9/52* (2013.01); *G06F 13/28* (2013.01); *G06F 15/163* (2013.01)

(56) References Cited

U.S. PATENT DOCUMENTS

| | | | |
|---|---|---|---|
| 11,663,044 B2* | 5/2023 | Wang | G06F 13/28 712/220 |
| 11,748,077 B2* | 9/2023 | Wang | G06F 8/447 717/140 |
| 2003/0097400 A1 | 5/2003 | Li et al. | |
| 2011/0029471 A1* | 2/2011 | Chakradhar | G06N 3/045 706/25 |
| 2013/0057563 A1 | 3/2013 | Persson | |
| 2013/0113809 A1 | 5/2013 | Kong et al. | |
| 2013/0160016 A1 | 6/2013 | Gummaraju et al. | |
| 2014/0173709 A1 | 6/2014 | Eldar et al. | |
| 2014/0259016 A1 | 9/2014 | Lottes et al. | |
| 2015/0187040 A1 | 7/2015 | Rao et al. | |
| 2015/0293786 A1 | 10/2015 | Jung et al. | |
| 2017/0236246 A1 | 8/2017 | Mrozek | |
| 2019/0347231 A1 | 11/2019 | Johnson et al. | |
| 2020/0201636 A1 | 6/2020 | Alexander et al. | |
| 2020/0225960 A1 | 7/2020 | Alexander et al. | |
| 2021/0124626 A1 | 4/2021 | Manula | |
| 2021/0374518 A1* | 12/2021 | Zhu | G06T 7/10 |

FOREIGN PATENT DOCUMENTS

| | | |
|---|---|---|
| CN | 110852930 A | 2/2020 |
| JP | 2021-529488 A | 10/2021 |
| TW | 200811658 A | 3/2008 |
| TW | 201207735 A1 | 2/2012 |
| TW | 201333874 A1 | 8/2013 |
| TW | 201616383 A | 5/2016 |
| WO | WO2014/099035 A1 | 6/2014 |

* cited by examiner

APPARATUS AND METHOD FOR SECONDARY OFFLOADS IN GRAPHICS PROCESSING UNIT

CROSS-REFERENCE TO RELATED APPLICATIONS

This is a Divisional Application of and claims the benefit of priority to U.S. patent application Ser. No. 17/366,383, filed on Jul. 2, 2021, which claims the benefit of priority to Patent Application No. 202011140493.0, filed in China on Oct. 22, 2020; the entirety of which is incorporated herein by reference for all purposes.

BACKGROUND

The disclosure generally relates to general-purpose computing on graphics processing unit (GPGPU), and, more particularly, to apparatuses, and methods for secondary offloads in a graphics processing unit.

Nowadays, a computing system equipped with a graphics processing unit (GPU) also includes a central processing unit (CPU). The CPU is suitable for performing the mathematical operations of conventional applications, while the GPU is suitable for computer graphics, and large-scale concurrent computations. The computing system being programmed may perform a variety of application tasks, including but not limited to linear and non-linear data transformation, database manipulation, big data calculation, artificial intelligence computation, audio and video data encoding and decoding, 3D modeling, image rendering, etc. In order to realize heterogeneous and high-concurrency calculations, the present invention introduces apparatuses, methods, and computer program products for secondary offloads in a graphics processing unit.

SUMMARY

The disclosure relates to an embodiment of an apparatus for second offloads in a graphics processing unit (GPU), including an engine; and a compute unit (CU). The engine is arranged operably to store an operation table including entries. The CU is arranged operably to fetch computation codes including execution codes, and synchronization requests; execute each execution code; and send requests to the engine in accordance with the synchronization requests for instructing the engine to allow components inside or outside of the GPU to complete operations in accordance with the entries of the operation table.

The disclosure further relates to an embodiment of a method for second offloads in a GPU, performed by a CU together with an engine in a graphics processing unit (GPU), including steps for: fetching, by the CU, computation codes including execution codes, and synchronization requests; executing, by the CU, each execution code; and sending, by the CU, requests to the engine in accordance with the synchronization requests for instructing the engine to allow components inside or outside of the GPU to complete operations in accordance with entries of an operation table.

The disclosure further relates to an embodiment of an apparatus for second offloads in a GPU, including an engine; and a CU. The CU is arranged operably to fetch computation codes; when each computation code is suitable to be executed by the CU, execute the computation code; and when each computation code is not suitable to be executed by the CU, generate a corresponding entry, and send a request with the corresponding entry to the engine for instructing the engine to allow a component inside or outside of the GPU to complete an operation in accordance with the corresponding entry.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words described the relationship between elements should be interpreted in a like fashion (e.g., "between" versus "directly between," "adjacent" versus "directly adjacent." etc.)

Figure 1:
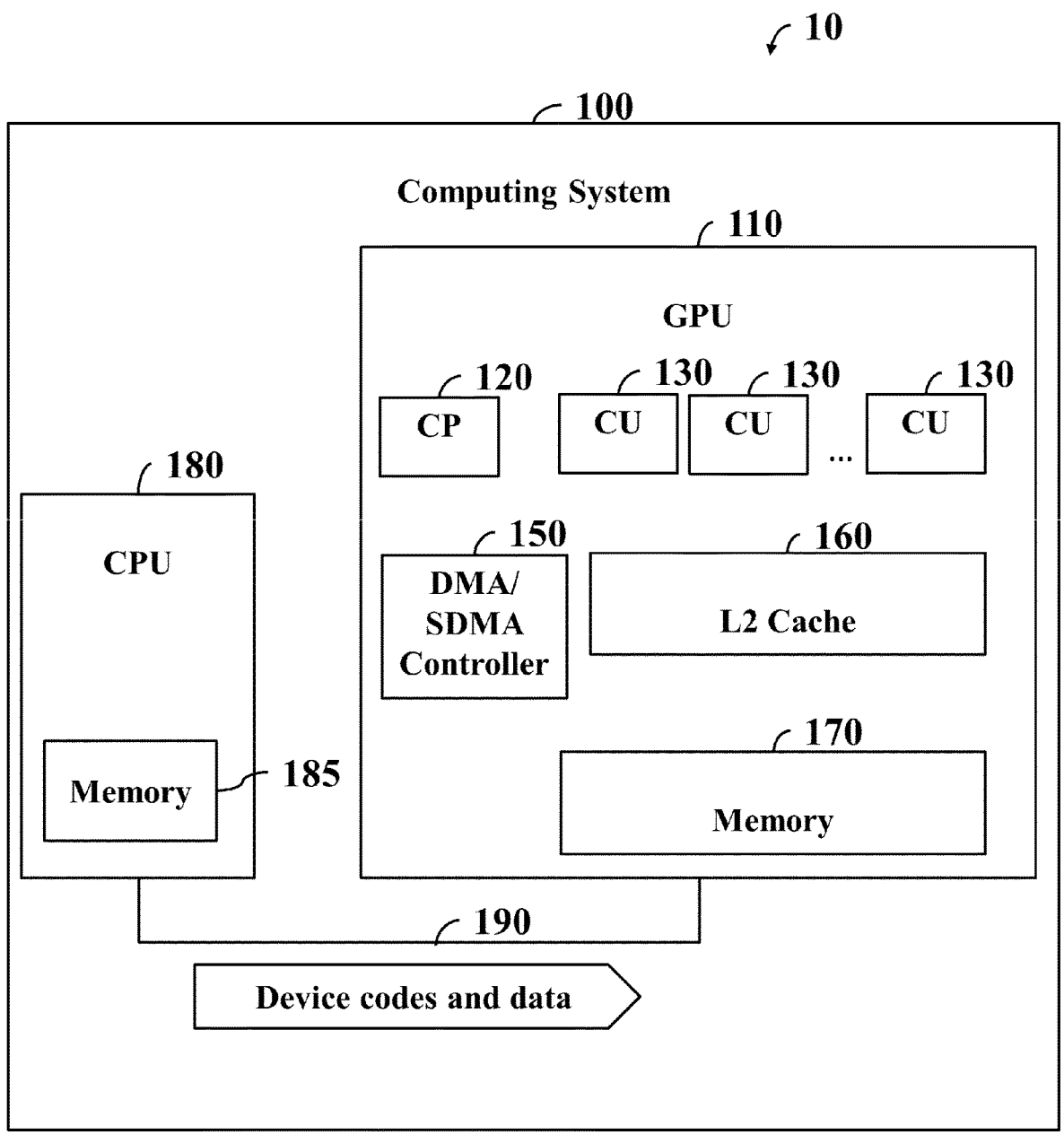
FIG. 1 is a block diagram of a computing system for realizing first offloads according to an embodiment of the invention.

Refer to FIG. 1. The electronic apparatus 10 may be equipped with the computing system 100 including the graphics processing unit (GPU) 110 to allow the computing system 100 being programmed to perform a variety of application tasks, including but not limited to linear and non-linear data transformation, database manipulation, big data calculation, artificial intelligence computation, audio and video data encoding and decoding, 3D modeling, image rendering, etc. The computing system 100 equipped with the GPU 110 also includes the central processing unit (CPU) 180. The GPU 110 may be referred to as a general-purpose computing on graphics processing unit (GPGPU). The electronic apparatus 10 may be realized in a mainframe, a workstation, a Personal Computer (PC), a laptop PC, a tablet PC, a mobile phone, a digital camera, a digital recorder, or other consumer electronic products. The GPU 110 and the CPU 180 includes the memory 170 and 185, respectively, and connect to each other to transfer data, addresses, control signals, etc. through the bus architecture 190, such as peripheral component interconnect express (PCI-E), etc.

Typically, the CPU 180 and the GPU 110 are suitable for different tasks. The CPU 180 is more suitable for processing complex sequential logics, complicated control flows, and interaction with the input and output devices. The GPU 110 is more suitable for concurrent computations for a single instruction with multiple data, such as the single instruction multiple data (SIMD) operations, the single instruction multiple thread (SIMT) technology, and so on. In order to effectively utilize the capabilities of the GPU 110, the CPU 180 may offload a series of device codes to the GPU 110. The process is briefly described as follows: The CPU 180 prepares data required by the device code in the memory 185, and then, issues a command to the command processor (CP) 120 in the GPU 110 to request to duplicate the data from the memory 185 to the memory 170 in the GPU 110. The CP 120 may complete the data duplication and storage between the memory 170 and 185 via the direct memory access/system direct memory access (DMA/SDMA) controller 150. The CPU 180 sends the device codes to be executed to the GPU 110, and issues the command to the GPU 110 for triggering the executions of the device codes. The compute units (CUs) 130 executes tasks indicated by the device codes to read data from the memory 170, perform various calculations, and write the calculated results into the memory 170. Meanwhile, the executions of device codes are coordinated by the CUS 130. After completing each execution, the CU 130 notifies the CPU 180 through the CP 120 that the corresponding device code has been executed completely. The CPU 180 migrates the calculated results in the memory 170 back to the memory 185 through the bus architecture 190. The process may be referred to as the first offload.

Figure 2:
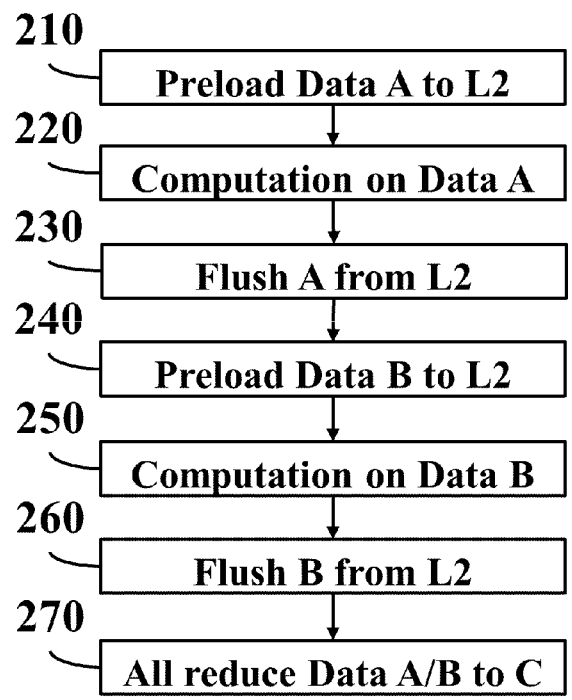
FIG. 2 is a schematic diagram of device codes according to an embodiment of the invention.

For example, refer to FIG. 2. The device code 210 indicates to preload data A in the memory 170 to the layer 2 (L2) cache 160. The device code 220 indicates to compute the data A in the L2 cache 160. The device code 230 indicates to flush the L2 cache 160 for cleaning the data A from the L2 cache 160. The device code 240 indicates to preload data B to the L2 cache 160. The device code 250 indicates to compute the data B in the L2 cache 160. The device code 260 indicates to flush the L2 cache 160 for cleaning the data B from the L2 cache 160. The device code 270 indicates to perform the all-reduce operation on the data A and B in the memory 170 to generate data C. The all-reduce operation may include any arithmetic or logical operation, such as, addition, subtraction, multiplication, division, taking the maximum value, taking the minimum value, performing any kind of comparison, or others.

In some implementations, the GPU 110 allows the CUs 130 to direct the executions of all device codes. However, it would cause an excessive workload of the CUs 130, leading to a bottleneck in the operation of computing system. While the CUs 130 operate, other components, such as the CP 120, the L2 cache 160, the DMA/SDMA controller 150, etc., would enter an idle state, resulting in an inefficient operation of computing system. Moreover, the tasks of certain device codes are improper to be completed by the CUs 130, but suitable to be completed by other components, such as the L2 cache 160, the DMA/SDMA controller 150, etc. For example, the device codes 210, 230, 240, 260, and 270, are not suitable to be completed by the CUS 130. If the task of the device code 210 or 240 is assigned to the CU 130 to execute, then the CU 130 has to issue a command to the memory 170 for reading data from a designated address in the memory 170, and storing the data in a designated address of the L2 cache 160. If the task of the device code 230 or 260 is assigned to the CU 130 to execute, then the CU 130 has to issue a command to the L2 cache 160 for cleaning data from a designated address in the L2 cache 160. If the task of the device code 270 is assigned to the CU 130 to execute, then the CU 130 issues commands to the memory 170 and the L2 cache 160 in sequence for reading the data A and B from designated addresses in the memory 170, and storing the data A and B in designated addresses of the L2 cache 160, and reading the data A and B from the designated addresses in the L2 cache 160, and storing the data A and B in the layer 1 (L1) cache of the CU 130. After the calculation has completed, the CU 130 issues commands to the L2 cache 160 and the memory 170 in sequence for reading the data C from the L1 cache in the CU 130, and storing the data C in a designated address of the L2 cache 160, and reading the data C from the designated address in the L2 cache 160, and storing the data C in a designated address of the memory 170. Therefore, the task executions for the aforementioned device codes directed by the CUs may block the executions for subsequent device codes, and consume a lot of time (that is, the clock cycles in the GPU 110), memory bandwidth, and other valuable resources, to degrade the overall performance.

In order to solve or reduce the shortcomings of the above implementations, from one aspect, an embodiment of the invention allows the GPU 110 to perform a secondary offload to transfer the tasks of certain device codes sent from the CPU 180 to suitable components to execute, including the components within the GPU 110, or outside of the GPU 110.

Figure 3:
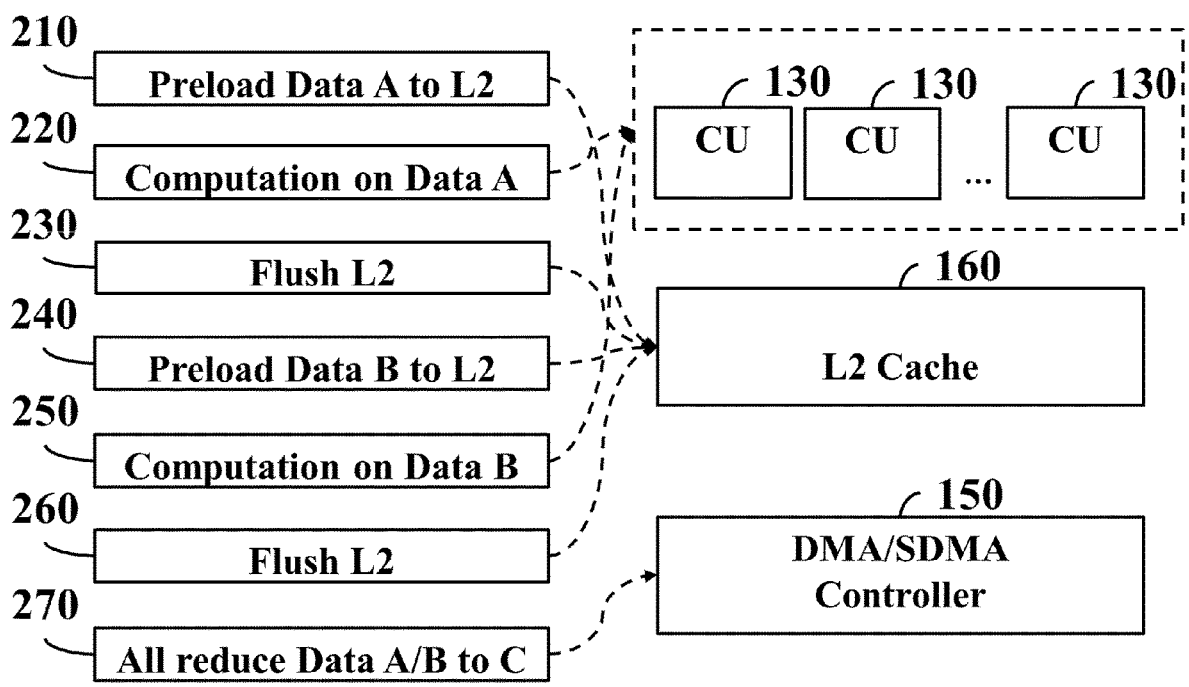
FIG. 3 is a schematic diagram illustrating secondary offloads according to an embodiment of the invention.

In some embodiments of the secondary offload, refer to FIG. 3. The GPU 110 may assign the tasks of the device codes 220 and 250 to be completed by the CUS 130. The CU 130 may perform various operations, such as addition and multiplication of integers and floating-point numbers, comparisons, Boolean operations, bit shifts, algebraic functions (e.g. plane interpolation, trigonometric functions, exponential functions, logarithmic functions), etc. The GPU 110 may assign the tasks of the device codes 210, 230, 240, and 260 to be completed by the L2 cache 160. The GPU 110 may assign the tasks of the device codes 270 to be completed by the DMA/SDMA controller 150, thereby enabling the DMA/

SDMA controller 150 to read data from a designated address in the memory 170 directly, store the data in the L1 cache in the CU 130, read a calculation result from the L1 cache in the CU 130, and store calculation result in a designated address in the memory 170.

In alternative embodiments of the secondary offload, the GPU 110 may assign the tasks of the device codes to the components outside of the GPU 110 to execute, which exclude the CPU 180, such as an application specific integrated circuit (ASIC), a field programmable gate array (FPGA), an accelerator, and others.

In alternative embodiments, the GPU 110 may assign the tasks of the device codes, which are suitable for execution by the CPU 180, back to the CPU 180, such as the device codes including a bulk of sequential logic, complex control flow (e.g. if-else judgements and consequent jumps), and excessive interactions with system input and output devices.

Figure 4:
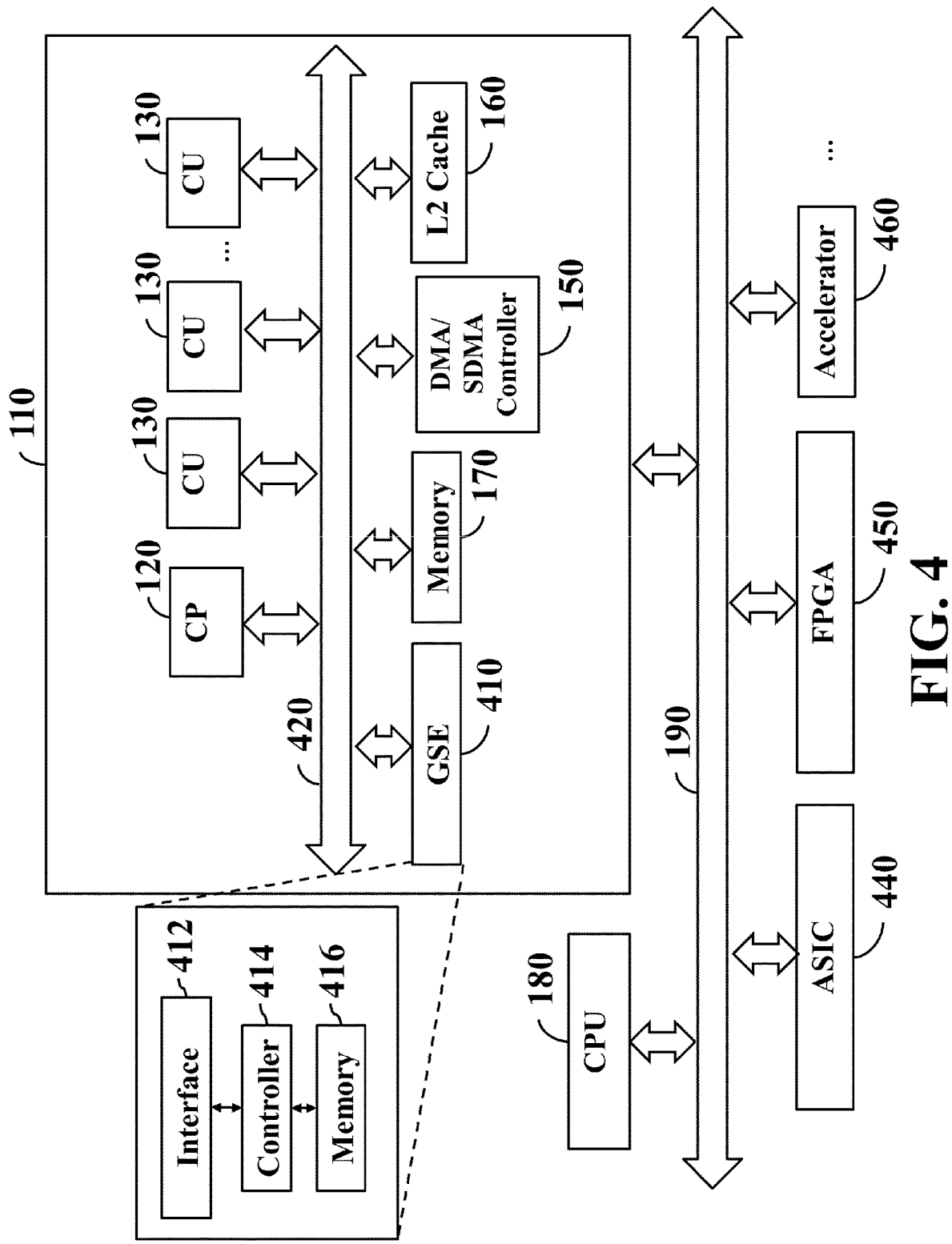
FIG. 4 is a block diagram of a computing system for realizing secondary offloads according to an embodiment of the invention.

In order to improve the overall system performance by practicing the secondary offload, from one aspect with reference made to FIG. 4, an embodiment of the invention installs the global synchronization engine (GSE) 410 in the GPU 110 for executing a wide range of sequential and parallel tasks in coordination with the CUS 130. The GSE 410 is interconnected with the CP 120, the CUS 130, the DMA/SDMA controller 150, the L2 cache 160, the memory 170, and other components through the internal bus architecture 420 to transmit device codes, data, addresses, control signals, and so on, and the GSE 410 is interconnected with the CPU 180, the ASIC 440, the FPGA 450, the accelerator 460, and other components through the CP 120 and the external bus architecture 190 to transmit device codes, data, addresses, control signals, and so on. The aforementioned components form a heterogenous system, and the GSE 410 is used to coordinate works by different modules in the heterogenous system. The GSE 410 includes the interface 412 and the memory 416. The interface 412 is used to communicate with the other modules attached to the internal bus architecture 420 using a specific communications protocol. The memory 416 is used to store necessary information about the operations to be performed.

Figure 5:
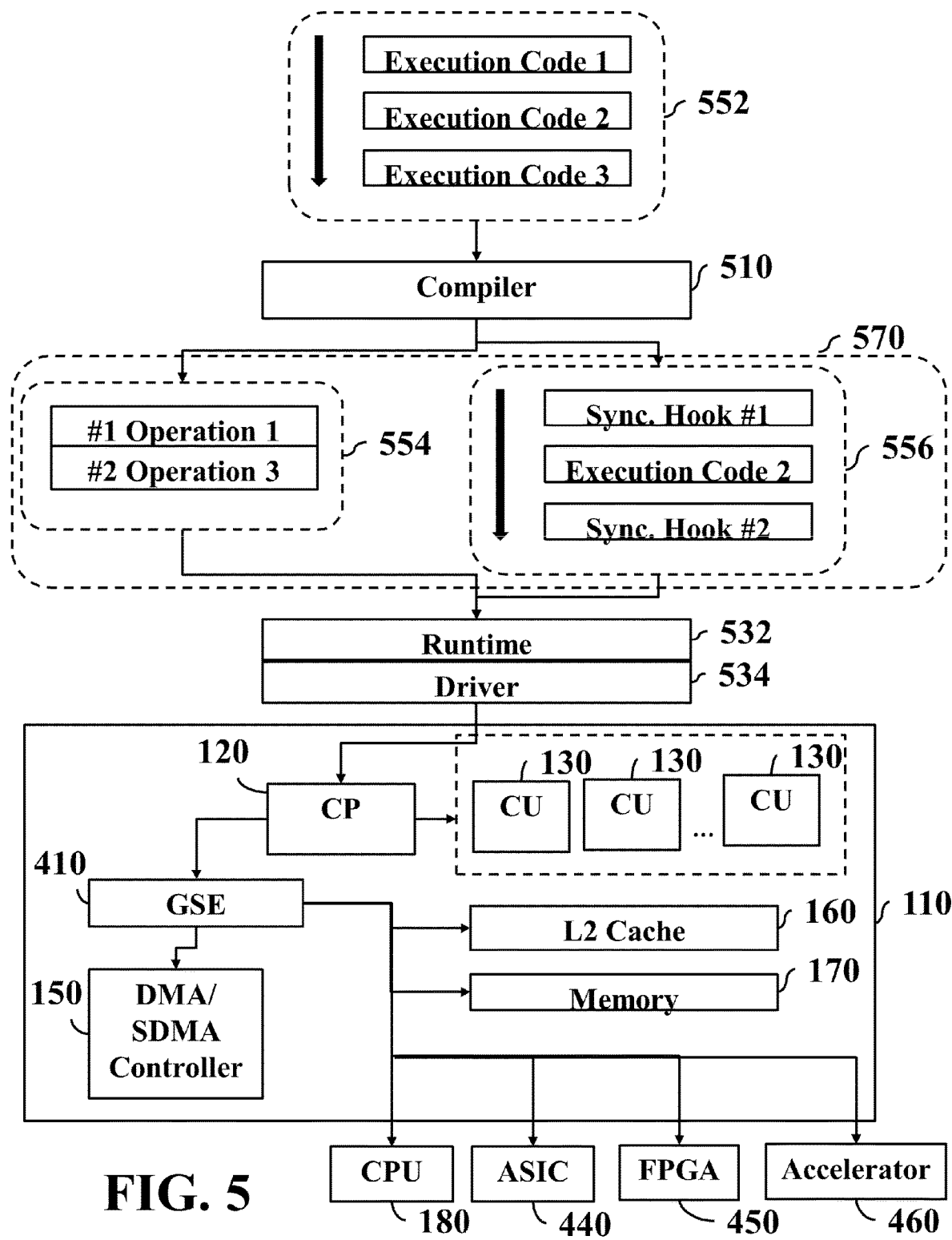
FIG. 5 is a schematic diagram of a practical process for secondary offloads according to an embodiment of the invention.

From another aspect, referring to FIG. 5, an embodiment of the invention does not require a program developer to write program codes in accordance with the hardware architecture as shown in FIG. 4, but employs the compiler 510 to analyze execution codes of the kernel 552 written by a programmer, and reconstruct them into the kernel 570 suitable for the heterogenous system as shown in FIG. 4, which includes the GSE operation table 554 and computation codes 556, thereby enabling the CP 120 to deliver the computation codes to the CUs 130 to execute, and deliver the GSE operation table 554 to the GSE 410. The GSE 410 instructs other components, such as the DMA/SDMA controller 150, the L2 cache 160, the memory 170, the CPU 180, the ASIC 440, the FPGA 450, the accelerator 460, etc., to perform specific tasks in accordance with the content of GSE operation table 554 (also refer to as secondary offload).

The whole process may be divided into two stages: compiling; and running. In the compiling stage, the compiler 510 reconstructs program codes. In the running stage, the concurrent executions by multiple modules (or components) are realized through the cooperation of the CP 120 and the GSE 410.

Figure 6:
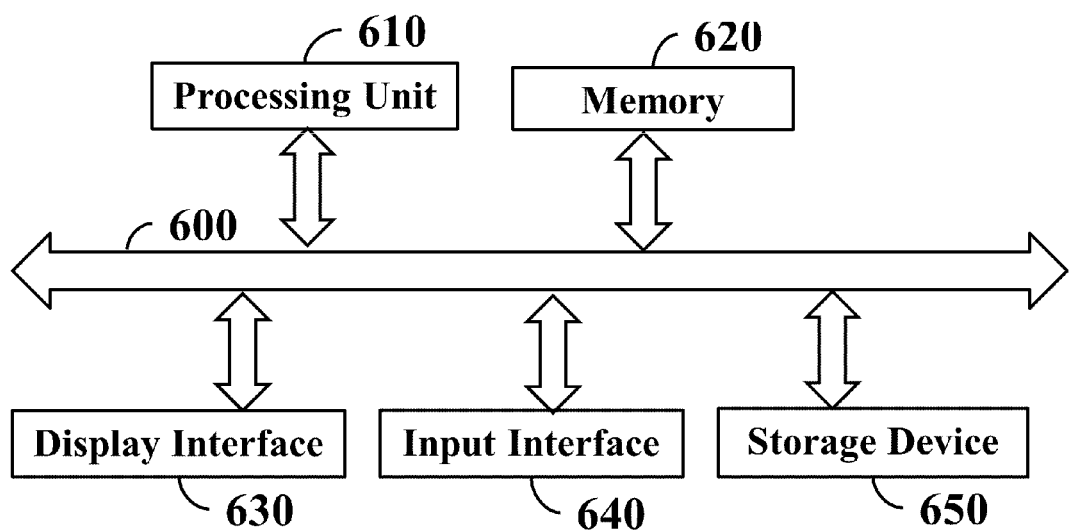
FIG. 6 is the system architecture of a compiling computer according to an embodiment of the invention.

Usually, a program developer uses a compiling computer to complete the compiling stage. Refer to FIG. 6. The compiling computer 60 includes the processing unit 610, the memory 620, the display interface 630, the input interface 640, and the storage device 650. The processing unit 610 may be implemented in numerous ways, such as with general-purpose hardware (e.g., a single processor, multiple processors or graphics processing units capable of parallel computations, or others) that is programmed using program codes of the compiler 510 to perform the functions recited herein. The memory 620 may be a dynamic random access memory (DRAM) to provide volatile storage space for temporarily storing data required by the processing unit 610 in a compiling process, such as variables, data tables, etc., and data read from the storage device 650, such as the kernel 552 to be analyzed. The storage device 650 may be a hard disk, a solid state drive (SSD), or others, to provide non-volatile storage space for storing the reconstructed GSE operation table 554 and the computation codes 556. The processing unit 610 may be connected to a displayer and an input device through the display interface 630 and the input interface 640, respectively.

Figure 7:
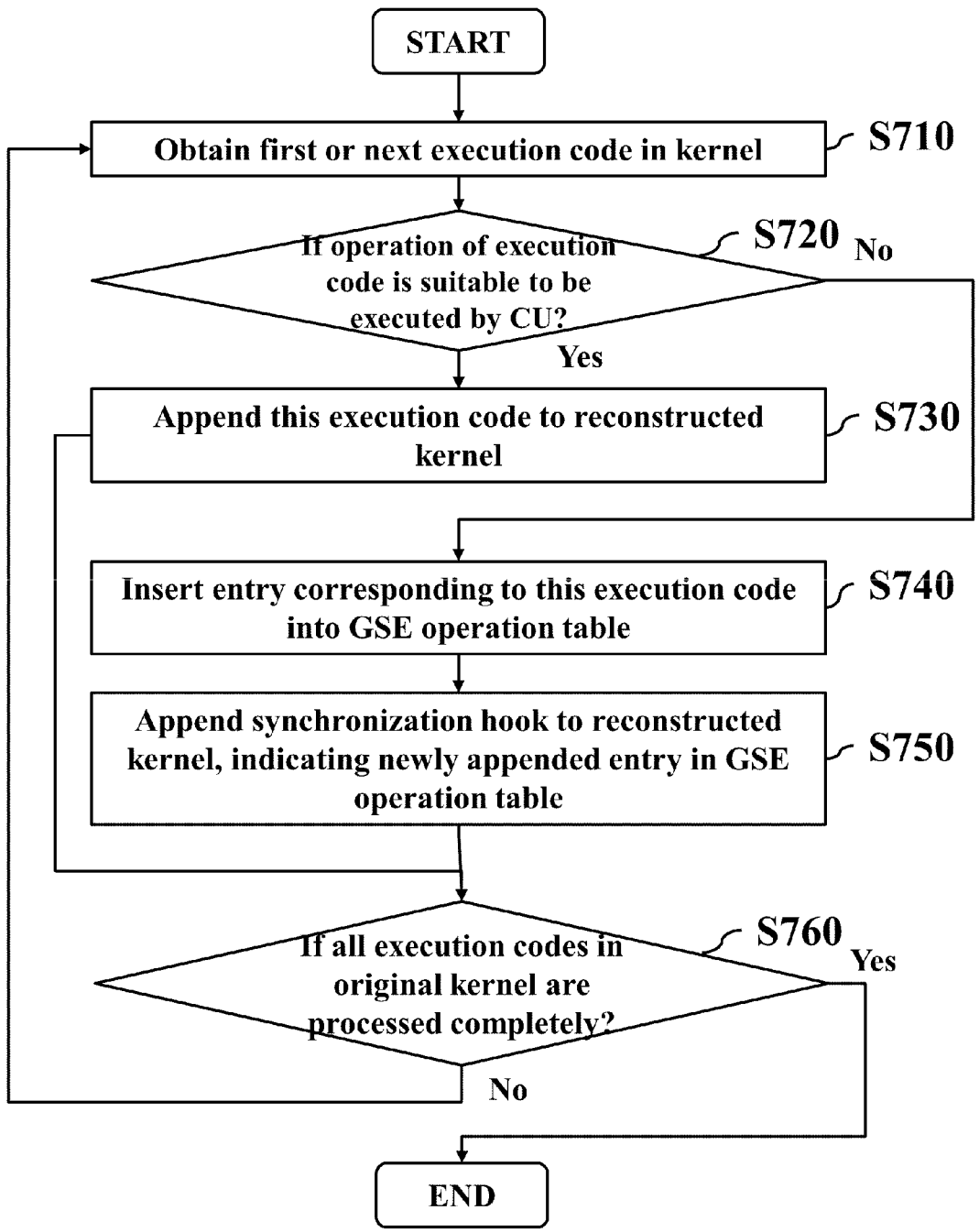
FIG. 7 is a flowchart of a method for compiling kernel codes according to an embodiment of the invention.

In the compiling stage, the flowchart as shown in FIG. 7, which is realized by the processing unit 610 when loading and executing computer program codes of the compiler 510, is used to generate the kernel 570 in compliance with the heterogenous system as shown in FIG. 4, including the GSE operation table 554 and the computation codes 556, in accordance with the execution codes in the original kernel 552. In alternative embodiments, the GSE operation table 554 and the computation codes 556 can be used to realize parallel executions by multiple modules in a heterogenous system different from that illustrated in FIG. 4, and the invention should not be limited thereto. The detailed steps are as follows:

Step S710: The first or the next execution code is obtained from the original kernel 552.

Step S720: It is determined whether the operation of the obtained execution code is suitable to be executed by the CU 130. If so, the process proceeds to step S730. Otherwise, the process proceeds to step S740. The compiler 510 marks this execution code when detecting that the operation of the obtained execution code is not suitable to be completed by the CU 130. For example, the following lists operations that are not suitable to be executed by the CU 130:

An operation is performed to preload data in a memory to an L2 cache.

An operation is performed to flush a designated portion of an L2 cache.

An all-reduce operation is performed on multiple data segments in a memory.

An operation is performed to realize a bulk of sequential logic.

An operation is performed to realize a complex control flow (for example, if-else judgements and consequent jumps).

An operation is performed to interact with a system input and output device heavily.

Step S730: The obtained execution code is appended to the reconstructed computation code 556. The execution code appended to the reconstructed computation code 556 is also referred to as an execution instruction. Moreover, the compiler 510 further determines whether the execution of this execution code needs to wait for the execution of the previously obtained execution code to be completed. If so, information indicating that this execution code needs to be synchronized is added. If not, information indicating that this execution code does not need to be synchronized is added. The compiler 510 may use a synchronization flag to indicate that: "1" indicates that is needed; and "0" indicates that is not needed. The order of obtained execution code appended to the reconstructed computation codes 556 matches the order of obtained execution code in the original kernel 552.

Step S740: An entry corresponding to the obtained execution code is inserted into the GSE operation table 554. The entry records information indicating that this operation is performed by which module (such as the DMA/SDMA controller 150, the L2 cache 160, the memory 170, the CPU 180, the ASIC 440, the FPGA 450, the accelerator 460, other component rather than the CU 130, etc.). The exemplary first and second operations described in step S720 are suitable to be performed by the L2 cache 160, the exemplary third operation described in step S720 is suitable to be performed by the DMA/SDMA controller 150, and the exemplary fourth to sixth operations are suitable to be performed by the CPU 180. Additionally, the entry further records information on how the operation corresponding to the execution code obtained in step S710 is performed, such as an operating command, operating parameters, etc.

Step S750: A synchronization hook is appended to the reconstructed computation codes 556, which carries a parameter indicating the newly inserted entry in the GSE operation table 554. Moreover, the compiler 510 further determines whether the execution of this synchronization hook needs to wait for the execution of the previously obtained execution code to be completed. If so, information indicating that this synchronization hook needs to be synchronized is added. If not, information indicating that this synchronization hook does not need to be synchronized is added. The compiler 510 may use a synchronization flag to indicate that: "1" indicates that is needed; and "0" indicates that is not needed. The order of synchronization hook appended to the reconstructed computation codes 556 matches the order of obtained execution code in the original kernel 552.

Step S760: It is determined whether all the execution codes in the original kernel 552 are processed completely. If so, the compiling process ends. Otherwise, the process proceeds to step S710.

Refer to the examples in FIG. 5. Since the execution codes 1 and 3 in the original kernel 552 are not suitable to be executed by the CU 130, the GSE operation table 554 contains two entries after the compiler 510 compiles that. The first entry stores information indicating which module the operation 1 is suitable for, and how to perform the operation 1, and the second entry stores information indicating which module the operation 3 is suitable for, and how to perform the operation 3. In the reconstructed computation code 556, the original execution code 1 is replaced with the synchronization hook carrying information indicating the first entry in the GSE operation table 554, and the original execution code 3 is replaced with the synchronization hook carrying information indicating the second entry in the GSE operation table 554. The compiled GSE operation table 554 and computation codes 556 are stored in a storage device of the electronic apparatus 10, thereby enabling the computing system 100 to run the reconstructed kernel 570.

In alternative embodiments, the electronic apparatus 10 is employed to complete the compiling stage. The flowchart as shown in FIG. 7 is realized when the CPU 180 loads and executes program codes of the compiler 510, and the invention should not be limited to use a dedicated compiling computer to complete the compiling stage.

Refer to FIG. 5. The CPU 180 executes program codes of the runtime 532 and the driver 534. In the running stage, the runtime 532 sends the program codes of kernel 570 to the driver 534 after receiving a request for running the kernel 570 from a client. The driver 534 detects that the kernel 570 has two parts: the GSE operation table 554 and the computation codes 556. Therefore, the driver 534 instructs the CP 120 to load the kernel 570 (may be referred to as the first offload). The CP 120 stores the GSE operation table 554 in the memory 416 of the GSE 410, thereby enabling the controller 414 in the GSE 410 to complete the operations indicated in the GSE operation table 554. Next, the CP 120 sends the computation codes 556 to the CU 130 to trigger code executions.

Figure 8:
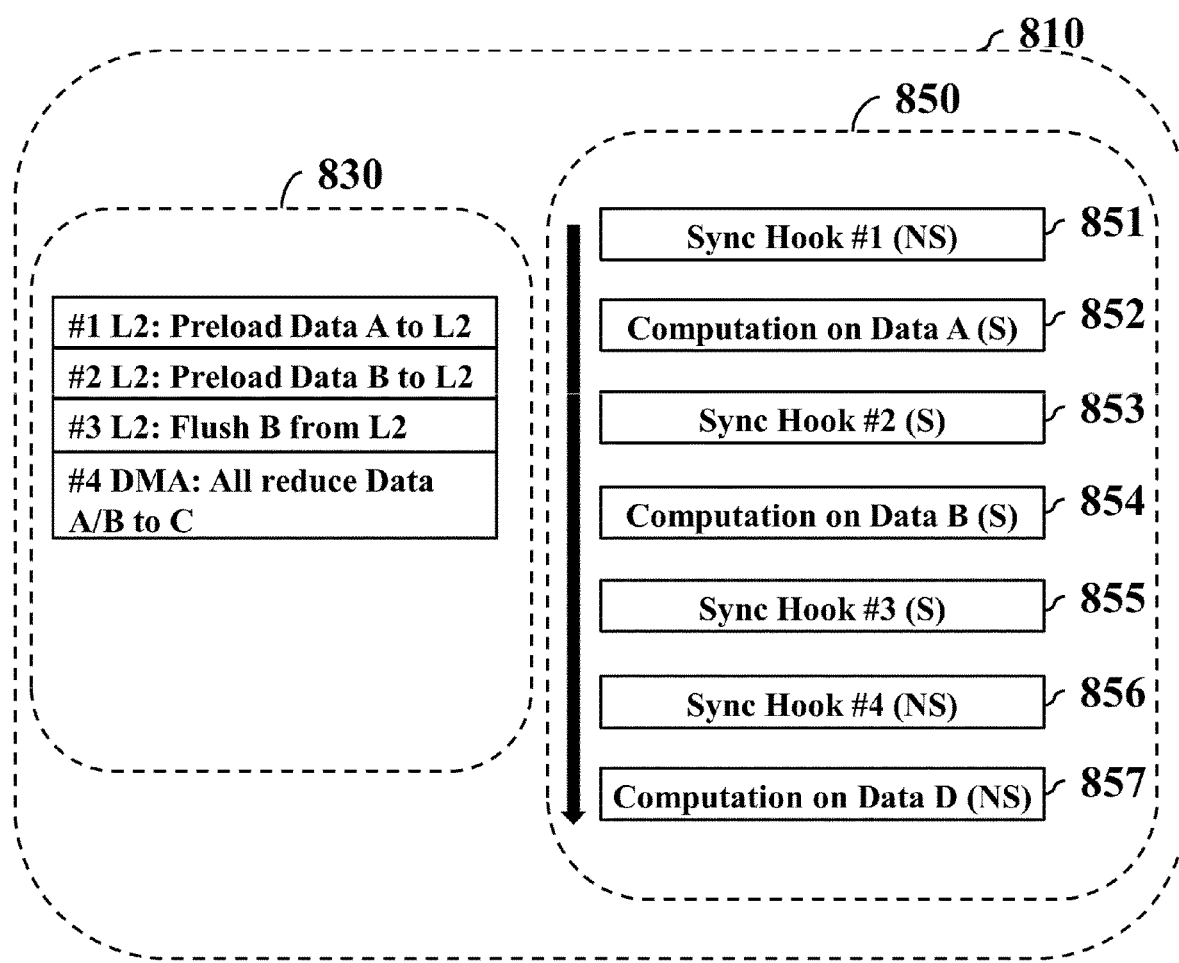
FIG. 8 is a schematic diagram illustrating a reconstructed kernel according to an embodiment of the invention.

Refer to another example illustrated in FIG. 8. The CP 120 receives the kernel 810 including the GSE operation table 830 and computation codes 850. The GSE operation table 830 includes four entries. In each entry, characters before the colon express information about which module is used to run an operation (for example, "L2" stand for the L2 cache 160, "DMA" stand for the DMA/SDMA controller 150, and the like), and characters after the colon express information about how to perform the operation (for more details, please also refer to the description related to FIG. 2 above). The computation codes 850 include seven codes 851 to 857. The codes 851, 853, 855, and 856 indicate synchronization hooks, and each synchronization hook is accompanied with a synchronization flag (displayed in brackets), where "S" means synchronization is required, and "NS" means synchronization is not required. The codes 852, 854, and 857 can be executed by the CU 130, and each code is accompanied with a synchronization flag (displayed in brackets), where "S" means synchronization is required, and "NS" means synchronization is not required.

Figure 9:
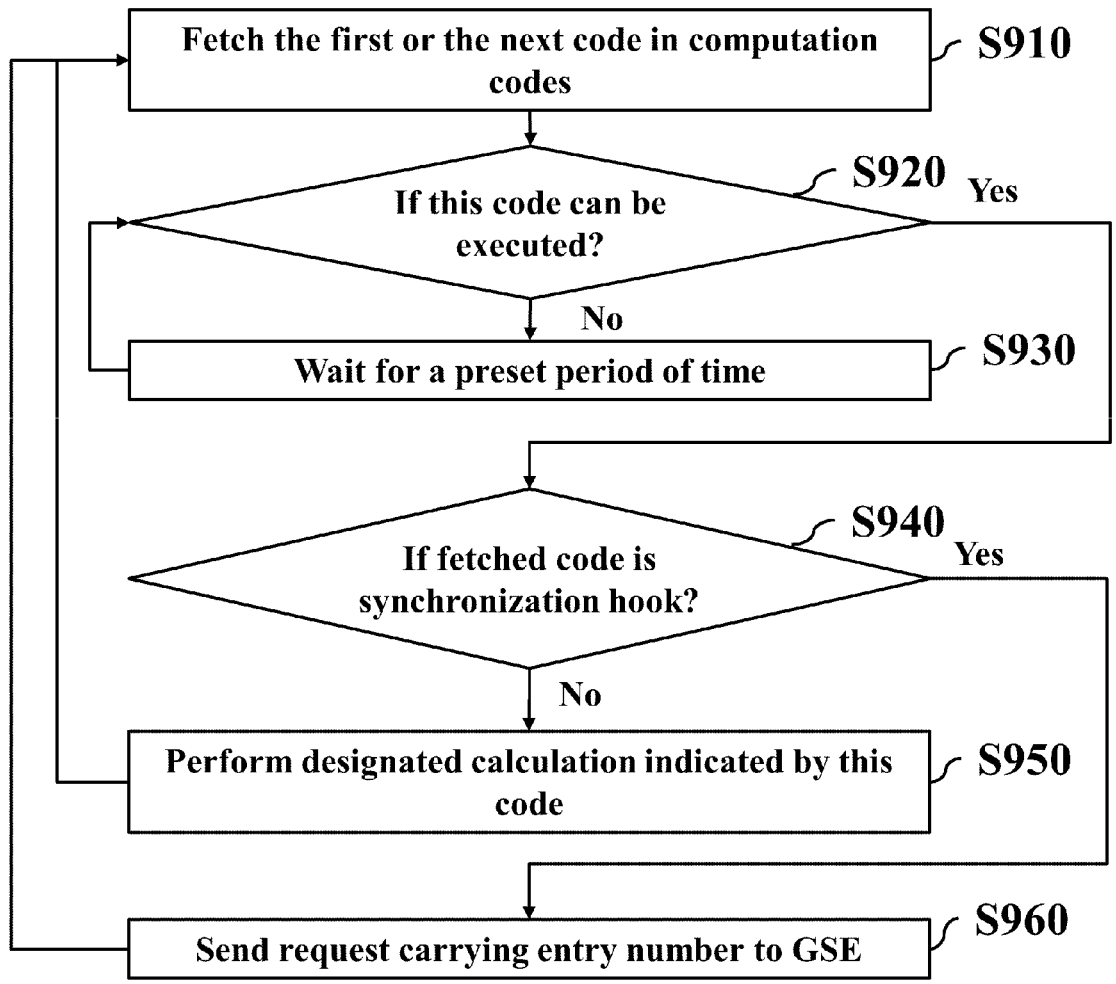
FIG. 9 is a flowchart of a control method performed by control circuit in a compute unit according to an embodiment of the invention.

At least one CU 130 includes control circuit for controlling the executions of computation codes 850. Refer to FIG. 9 illustrating a flowchart of the control method, which is performed by the control circuit in the CU 130.

Step S910: The first or the next code in the computation codes 850 is fetched.

Step S920: It is determined whether the fetched code can be executed. If so, the process proceeds to step S940. Otherwise, the process proceeds to step S930. For example, when the synchronization flag associated with this code indicates that there is no need to wait for the execution completion of any previous code, it means that this code can be executed. When the synchronization flag associated with this code indicates that it is necessary to wait for the execution completion of any previous code, and the previous code has been executed completely, it means that this code can be executed. When the synchronization flag associated with this code indicates that it is necessary to wait for the execution completion of any previous code, but the previous code hasn't been executed completely, it means that this code cannot be executed.

Step S930: Wait for a preset period of time.

Step S940: It is determined whether the fetched code is a synchronization hook. If so, the process proceeds to step S960. Otherwise (i.e. the fetched code is suitable to be executed by the CU 130), the process proceeds to step S950.

Step S950: A designated calculation indicated by this code is performed.

Step S960: A request carrying an entry number is sent to the GSE 410. The GSE 410 searches the GSE operation table 830 for the entry indicated by the entry number, and issues a proper command to a designated component in accordance with the information recorded in the entry after receiving the request. The GSE 410 informs the CU 130 that the request has been completed after receiving information indicating that the operation has been performed completely from the component.

Figure 10:
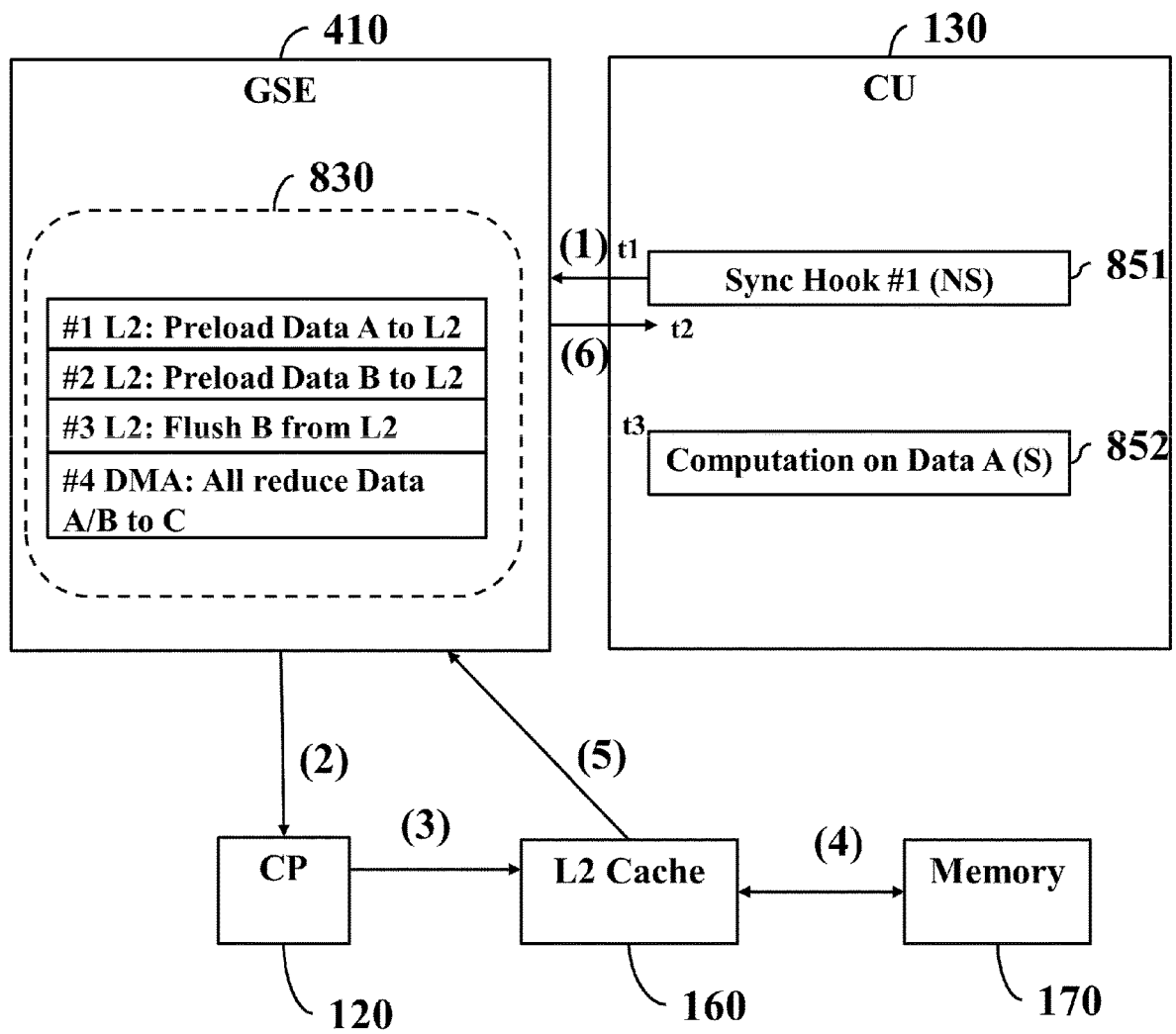
FIG. 10 shows an exemplary sequential-execution sequence applied in secondary offloads according to an embodiment of the invention.

Refer to FIG. 10. Since the code 852 needs to wait for the execution of the previous code to continue, the CU 130 cannot execute the code 852 immediately after sending a request including the entry number #1 to the GSE 410 at the time point t1. The controller 414 in the GSE 410 searches the GSE operation table 830 in the memory 416 for the entry including the entry number #1, and directs the CP 120 to issue a command to the L2 cache 160 through the interface 412 in accordance with the content of the entry #1 after receiving the request, thereby enabling the L2 cache 160 to preload the data A from the memory 170 to the L2 cache 160. The controller 414 in the GSE 410 notifies the CU 130 that the request has been processed completely through the interface 412 at the time point t2 after receiving information indicating that the execution has been completed from the L2 cache 160 through the interface 412. After that, at the time point t3, the CU 130 performs a calculation on the data A in the L2 cache 160 in accordance with the indication in the code 852.

Figure 11:
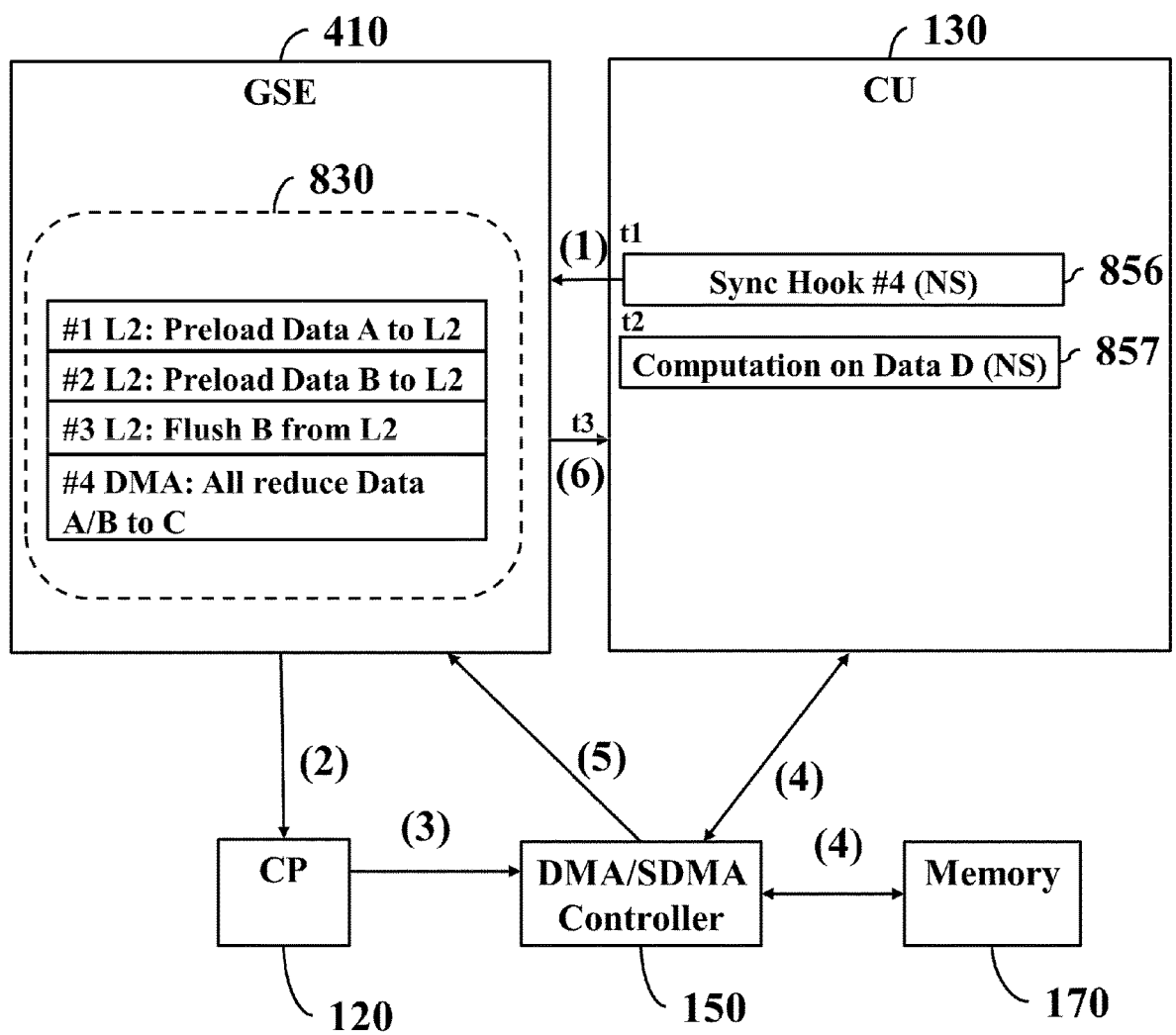
FIG. 11 shows an exemplary parallel-execution sequence applied in secondary offloads according to an embodiment of the invention.

Refer to FIG. 11. Since the code 857 does not need to wait for the execution of the previous code, the CU 130 promptly executes the code 857 for performing a calculation on the data D in the L2 cache 160 at the time point t2 after sending a request including the entry number #4 at the time point t1. The controller 414 in the GSE 410 searches the GSE operation table 830 in the memory 416 for the entry including the entry number #4, and directs the CP 120 to issue a command to the DMA/SDMA controller 150 through the interface 412 in accordance with the content of the entry #4 after receiving the request, thereby enabling the DMA/SDMA controller 150 to perform an all-reduce operation on the data A and B in the memory 170 to generate the data C. The controller 414 in the GSE 410 notifies the CU 130 that the request has been processed completely through the interface 412 at the time point t3 after receiving information indicating that the execution has been completed from the DMA/SDMA controller 150 through the interface 412. Therefore, the CU 130 and the DMA/SDMA controller 150 are both running between the time points t1 and t3, which would improve the concurrency and reduce the execution time for the kernel 810.

One of the advantages of the aforementioned embodiment is that through the setting of the GSE 410 and the reconstruction of kernel code, the CU 130 would focus on performing its own most advantageous pure computing tasks, resulting in the reduction of clock cycles spent to execute tasks other than pure computation, and occupation of memory bandwidth.

Another advantage of the aforementioned embodiment is that due to the secondary offload through the GSE 410, operations would be assigned to suitable other components, such as the CPU 180, the components inside or outside of the GPU 110, etc., resulting in more application flexibility.

Typically, the whole kernel contains interleaved CPU code and GPU code, so that the kernel is alternately executed between the CPU 180 and the GPU 110. The CPU 180 offloads one or more subsequent GPU codes (i.e. the device codes) to the GPU 110 to execute after executing the designated CPU code(s). The CPU 180 executes next segment of CPU codes after the offloaded GPU codes have been executed. The alternation is repeated until the whole kernel is executed completely. However, such frequent offloads, and the interactions of waiting for the completion of execution by the GPU 110 also reduces the execution feasibility. Another advantage of the aforementioned embodiment is that it avoids excessive task submission and waiting between the CPU 180 and the GPU 110 because the CPU 180 can offload more device codes to the GPU 110 at one time, and then, the GSE 410 can secondary offload a few suitable operations back to the CPU 180, leading to an improved utilization of computing resource.

In alternative embodiments, the GSE operation table 554 and the computation codes 556 are not generated by the compiler 510 in the compiling stage, but instead, are generated by the CU 130 in the running stage. When detecting execution codes that are not suitable for their executions in the original kernel 552, the CU 130 directly generates the above-described corresponding entries in the GSE operation table 554 or 830, and sends the generated corresponding entries and the requests together to the GSE 410, which instruct the GSE 410 to allow other components inside or outside of the GPU 110 to complete designated operations in accordance with the content of corresponding entries. Those artisans may appropriately modify steps S940 and S960 in FIG. 9 to integrate the technical solutions described above.

Some or all of the aforementioned embodiments of the method of the invention may be implemented in a computer program, such as a compiler, a runtime, a driver, etc., in a specific programming language, or others. Other types of programs may also be suitable, as previously explained. Since the implementation of the various embodiments of the present invention into a computer program can be achieved by the skilled person using his routine skills, such an implementation will not be discussed for reasons of brevity. The computer program implementing some or more embodiments of the method of the present invention may be stored on a suitable computer-readable data carrier such as a DVD, CD-ROM, USB stick, a hard disk, which may be located in a network server accessible via a network such as the Internet, or any other suitable carrier.

Although the embodiment has been described as having specific elements in FIGS. 1, 4, and 6, it should be noted that additional elements may be included to achieve better performance without departing from the spirit of the invention. Each element of FIGS. 1, 4, and 6 is composed of various circuits and arranged to operably perform the aforementioned operations. While the process flows described in FIGS. 7, and 9 include a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An apparatus for secondary offloads in a graphics processing unit (GPU), comprising:
an engine; and
a compute unit (CU), coupled to the engine, arranged operably to: fetch a plurality of execution codes; when each execution code is suitable to be executed by the CU, execute the execution code; and when each execution code is not suitable to be executed by the CU, generate a first corresponding entry, and send a first request with the first corresponding entry to the engine for instructing the engine to allow a component inside or outside of the GPU to complete an operation in accordance with the first corresponding entry.

2. The apparatus of claim 1, wherein the first corresponding entry comprises information indicating that an operation is performed by a component inside or outside of the GPU, and information indicating how to perform the operation.

3. The apparatus of claim 2, wherein the first corresponding entry comprises an operating command, and an operating parameter.

4. The apparatus of claim 1, wherein the engine comprises:
an interface; and
a controller, coupled to the memory and the interface, arranged operably to: after receiving the first request with the first corresponding entry from the CU through the interface, direct a command processor (CP) through the interface to issue a command to a component inside or outside of the GPU in accordance with content of the first corresponding entry.

5. The apparatus of claim 4, wherein the CP is installed in the GPU.

6. The apparatus of claim 4, wherein the controller is arranged operably to: after receiving information indicating that an execution has been completed from the component inside or outside of the GPU through the interface, notify the CU that a corresponding request has been processed completely.

7. The apparatus of claim 1, wherein the CU is arranged operably to determine whether each suitable or unsuitable execution code can be executed; if the suitable execution code can be executed, then execute the suitable execution code; if the unsuitable execution code can be executed, then generate a second corresponding entry, and send a second request with the second corresponding entry to the engine for instructing the engine to allow a component inside or outside of the GPU to complete an operation in accordance with the second corresponding entry; if the suitable execution code or the unsuitable cannot be executed, then wait for a period of time until next round of judgment.

8. The apparatus of claim 7, wherein, when a synchronization flag associated with any suitable execution code or any unsuitable execution code indicates that there is no need to wait for an execution completion of a previous code, or when the synchronization flag associated with any suitable execution code or any unsuitable execution code indicates that it is necessary to wait for an execution completion of a previous code, and the previous code has been executed completely, the suitable execution code or the unsuitable execution code can be executed; when the synchronization flag associated with any suitable execution code or any unsuitable execution code indicates that it is necessary to wait for an execution completion of a previous code, but the previous code hasn't been executed completely, the suitable execution code or the unsuitable execution code cannot be executed.

9. The apparatus of claim 1, wherein the component in the GPU is a layer 2 cache, or a direct memory access/system direct memory access (DMA/SDMA) controller, and the component outside of GPU is a central processing unit (CPU).

10. The apparatus of claim 1, wherein the execution codes are received from a central processing unit (CPU) outside of GPU.

11. A method for secondary offloads, performed by a compute unit (CU) together with an engine in a graphics processing unit (GPU), comprising:
fetching, by the CU, a plurality of execution codes;
executing, by the CU, each execution code when each execution code is suitable to be executed by the CU; and
generating, by the CU, a first corresponding entry, and sending a first request with the first corresponding entry to the engine for instructing the engine to allow a component inside or outside of the GPU to complete an operation in accordance with the first corresponding entry when each execution code is not suitable to be executed by the CU.

12. The method of claim 11, wherein the first corresponding entry comprises information indicating that an operation is performed by a component inside or outside of the GPU, and information indicating how to perform the operation.

13. The method of claim 12, wherein the first corresponding entry comprises an operating command, and an operating parameter.

14. The method of claim 11, comprising:
receiving, by the engine, the first request with the first corresponding entry from the CU; and
directing, by the engine, a command processor (CP) to issue a command to a component inside or outside of the GPU in accordance with content of the first corresponding entry.

15. The method of claim 14, wherein the CP is installed in the GPU.

16. The method of claim 14, comprising:
receiving, by the engine, information indicating that an execution has been completed from the component inside or outside of the GPU; and
notifying, by the engine, the CU that a corresponding request has been processed completely.

17. The method of claim 11, comprising:
determining, by the CU, whether each suitable or unsuitable execution code can be executed;
executing, by the CU, the suitable execution code if the suitable execution code can be executed;
generating, by the CU, a second corresponding entry, and sending a second request with the second corresponding entry to the engine for instructing the engine to allow a component inside or outside of the GPU to complete an operation in accordance with the second corresponding entry if the unsuitable execution code can be executed; and
waiting, by the CU, for a period of time until next round of judgment if the suitable execution code or the unsuitable cannot be executed.

18. The method of claim 17, wherein, when a synchronization flag associated with any suitable execution code or any unsuitable execution code indicates that there is no need to wait for an execution completion of a previous code, or when the synchronization flag associated with any suitable execution code or any unsuitable execution code indicates that it is necessary to wait for an execution completion of a previous code, and the previous code has been executed completely, the suitable execution code or the unsuitable execution code can be executed; when the synchronization flag associated with any suitable execution code or any unsuitable execution code indicates that it is necessary to wait for an execution completion of a previous code, but the previous code hasn't been executed completely, the suitable execution code or the unsuitable execution code cannot be executed.

19. The method of claim 11, wherein the component in the GPU is a layer 2 cache, or a direct memory access/system direct memory access (DMA/SDMA) controller, and the component outside of GPU is a central processing unit (CPU).

20. The method of claim 11, wherein the execution codes are received from a central processing unit (CPU) outside of GPU.

* * * * *